United States Patent [19]

Yoon

[11] Patent Number: 5,304,850
[45] Date of Patent: Apr. 19, 1994

[54] POWER LINE CARRIER FREQUENCY BREAKER

[75] Inventor: Young T. Yoon, deceased, late of Seoul, Rep of Korea, Kyong Sun Jun, executor

[73] Assignee: Kyong Sun Jun, Seoul, Rep. of Korea

[21] Appl. No.: 773,147

[22] Filed: Oct. 8, 1991

[30] Foreign Application Priority Data

Jan. 18, 1991 [KR] Rep. of Korea .................... 91-825

[51] Int. Cl.$^5$ ................................. H02J 3/00
[52] U.S. Cl. ...................... 307/30; 336/181; 336/184
[58] Field of Search .............. 302/11, 12, 13, 30; 361/139, 142; 336/181, 184

[56] References Cited

U.S. PATENT DOCUMENTS

| | | | |
|---|---|---|---|
| 4,019,122 | 4/1977 | Ryan | 323/60 |
| 4,041,431 | 8/1977 | Enoksen | 336/160 |
| 4,763,093 | 8/1988 | Cirkel et al. | 336/58 |
| 5,006,728 | 4/1991 | Yonekura et al. | 307/30 |
| 5,023,858 | 6/1991 | Kurano et al. | 336/69 |

OTHER PUBLICATIONS

"Handbook of Remote Control & Automation Techniques", second edition, Tab Books, Inc., Cunningham & Horn, pp. 174–193, 1984.

Primary Examiner—Jeffrey A. Gaffin
Attorney, Agent, or Firm—Merchant, Gould, Smith, Edell, Welter & Schmidt

[57] ABSTRACT

A breaker apparatus for preventing a power line carrier frequency from moving along a power supply lead. The breaker comprises a core member with a first leg, a second leg and a third leg where each leg extends between a top section and a bottom section of the core member. The top section and a first leg portion define a top core section and the bottom and a second leg portion define a bottom core section. The top and bottom core sections are separate sections. A first power supply line enters the core member from one of the sides of the core member and coils around the first leg of the core member and exits from the same side as entering the core member to form a first coil winding. A second power supply line enters the core member from the other remaining of the sides of the core member and winds around the third leg of the core member and exits from the same side as entering the core member to form a second coil winding. The first and the second power supply lines are connected to a power line carrier frequency generator of a home automation appliance. The breaker enables a power line carrier frequency entering the first coil and the second coil from the power supply to be blocked and a power line carrier frequency inputted by the home automation appliance to be blocked.

8 Claims, 3 Drawing Sheets

POWER LINE CARRIER FREQUENCY BREAKER

BACKGROUND OF THE INVENTION

Field of the Invention

The invention relates to a power line carrier frequency breaker, and more particularly, to a power line carrier frequency breaker for blocking a power line carrier frequency from moving along a power supply lead.

Generally, the remote control of a home electric apparatus and a home electronic apparatus are performed by a home automation appliance. At this time, the home automation appliance utilizes a power line carrier frequency of, for example, 120 KHZ±10 KHZ. Since the power line carrier frequency is used with a common voltage source, there is a disadvantage in that the home automation appliance fails to properly perform due to a flow-in or flow-out of the power line carrier frequency to or from another house through the power supply line.

For solving the above problem, a power line carrier frequency breaker is established on the lead-in line of a power supply line for blocking the power line carrier frequency and passing a normal frequency. However, since the voltage source has a high voltage and a high current in comparison to the voltage and current of the general electronic circuit, the general passive element constituting the power line carrier frequency breaker, that is a coil and condenser, must high voltage.

Further, the power line carrier frequency breaker has a large volume due to the construction of a multistage filter. Accordingly, there is a disadvantage in that the cost due to the separate construction increases and the aesthetic view near the breaker deteriorates.

Therefore, it is an object of the present invention to solve the problem set forth above and to provide a power line carrier frequency breaker which has low power consumption.

The preceding objects should be construed as merely presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

The power line carrier frequency breaker of the present invention is defined by the claims with a specific embodiment shown in the attached drawings. For the purpose of summarizing the invention, the invention relates to a power line carrier frequency breaker for use with a first and a second power supply line. The power line carrier frequency breaker comprises a core member having a first side and a second side, a top section and a bottom section, with a first leg, a second leg and a third leg extending between the top section and the bottom section. Each leg is spaced apart from each other leg and each leg has first portion and a second portion to enable the core section to be detached or separated into a top core section and a bottom core section. This structure enables, in use, first power supply line to enter the core member from one of the sides of the core and be wound around the first leg of the core member in a first direction and exit from the same side of the core as the side the first power supply line entered the core member to form a first coil winding. The second power supply line enters the core member from the remaining of the sides of the core member and is wound around the third leg of the core member in a second direction which is opposite the first direction and exits from the same side as entering the core member to form a second coil winding. Thus, when the lines are connected to a power line carrier frequency generator of a home automation appliance, the power line carrier frequency entering the first coil and the second coil from the power supply lines is blocked and the power line carrier frequency inputted from the home automation appliance is blocked.

The power line carrier frequency breaker preferably includes a condenser connected in parallel to the power supply lines prior to the power supply lines being wound around the first leg and the third leg of the core member, respectively, for absorbing irregular power line noise.

The legs of the core member preferably have the same length.

Thus, in the preferred embodiment the power line carrier frequency breaker for use with a first and a second power supply line comprises a core member having a first side and a second side and a top section and a bottom section with a first leg, a second leg and a third leg with each leg having the same length and extending between the top section and the bottom section with each leg being spaced apart from each other and each the leg having a first portion and a second portion to enable the core to be separable into a top core section to and a bottom core section. A condenser is connected in parallel to the power supply lines prior to the power supply line being wound around the first leg and the third leg of the core member, respectively, for absorbing irregular power line noise. In use, the first power supply line enters the core member from one of the sides of the core member so as to be in contact with one of the top or bottom sections and is wound around the first leg of the core member in a first direction and exits from the same side as entering the core so as not to contact one of the top or bottom sections to form a first coil winding. The second power supply line enters the core from the remaining of the sides of the core so as not to contact one of the top or bottom sections and is wound around the third leg of the core member in a second direction which is opposite the first direction and exits from the same side as entering the core member so as to be in contact with the remaining of the top or bottom sections to form a second coil winding. Thus, upon connecting the lines to a power line carrier frequency generator of a home automation appliance, the power line carrier frequency entering the first coil and the second coil from the power supply lines is blocked and the power line carrier frequency inputted from the home automation appliance is also blocked.

The present invention also includes a power line carrier frequency breaker which comprises a first and a second power supply line for supplying electrical power. A core member is utilized with a first side and a second side, a top section and a bottom section and a first leg, a second leg and a third leg each of which extend between the top section and the bottom section and are each spaced apart from each other. Each the leg includes a first portion and a second portion to enable the core to be separable or detachable into a top section and a bottom core section. The first power supply line enters the core from one of the sides of the core and is wound around the first leg of the core member in a first direction and exits from the same side as the side the line entered the core to form a first coil winding. The second power supply line enters the core from the remaining of the sides of the core and is wound around the third leg of the core member in a second direction which is opposite the first direction and exits from the same side as the side the line entered the core to form a second coil winding. Thus, when the lines are connected to a power line carrier frequency generator of a home automation appliance, the power line carrier frequency entering the first coil and the second coil wound around the core from the power supply lines is blocked and the power line carrier frequency inputted from the home automation appliance is blocked.

Preferably, the present invention includes at least one of the following elements. The first and the second power supply lines each enter from the core at the top section and each exit the core from the bottom section. Each first, second and third leg is of the same length. The power line carrier frequency breaker is electrically shielded. In the core member the first portion and the second portion of each leg have the same length such that the top section of the core member and the bottom section of the core member are the same.

Thus, in the preferred embodiment, the power line carrier frequency breaker comprises a first and a second power supply line for supplying electrical power. A core member having a first side and a second side, a top section and a bottom section and a first leg, a second leg and a third leg with each leg having the same length and extending between the top section and the bottom section and with each leg being spaced apart from each other is utilized. detached or separated from the bottom section and each the first portion and the second portion of each leg are of the same length such that the top core section of the core member and the bottom core section of the core member are similar. Thus, the top section and the bottom section would have an "E" shape. The first power supply line enters the core from one of the sides of the core and is wound around the first leg of the core member in a first direction and exits from the same side as entering the core member to form a first coil winding. The second power supply line enters the core from the remaining of the sides of the core and is wound around the third leg of the core member in a second direction which is opposite the first direction and exits from the same side as entering the core to form a second coil winding. The first and the second power supply lines each enter the core member at the top section and each exit the core member from the bottom section. Thus, when the lines are connected to a power line carrier frequency generator of a home automation appliance, the power line carrier frequency entering the first coil and the second coil wound around the core from the power supply is blocked and the power line carrier frequency inputted from the home automation appliance is blocked. Preferably, the power line carrier frequency breaker is electrically shielded.

The first and second power supply lines are insulated and may supply either 110 volts or 220 volts, and the core member is electrically conductive and is preferably made of iron.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which.

Similar reference characters refer to similar parts throughout the several views of the drawings.

DETAILED DESCRIPTION OF THE INVENTION

Figure 1:
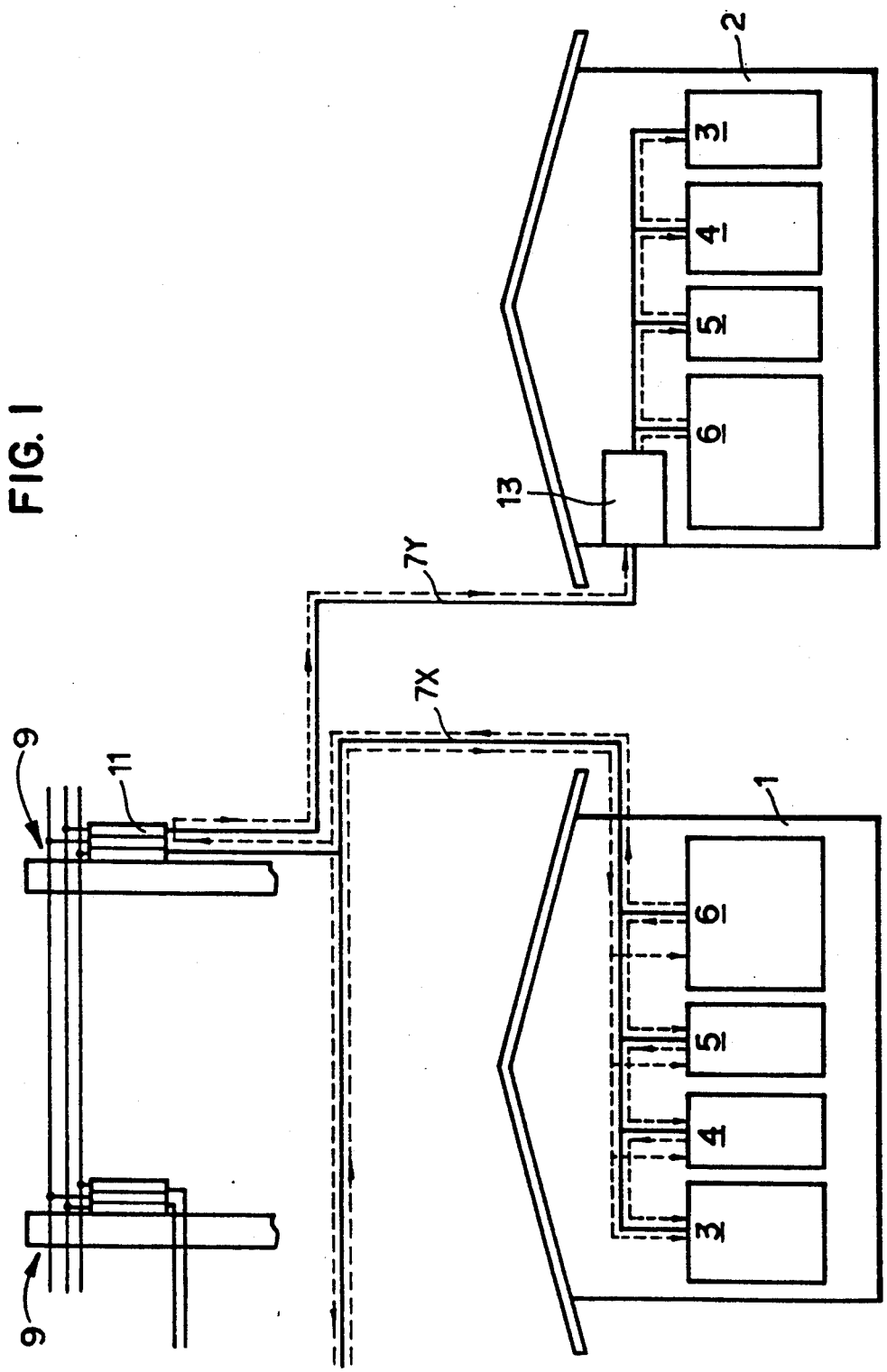
FIG. 1 illustrates the power line carrier frequency breaker of the present invention, in use.

FIG. 1 illustrates the power line carrier frequency breaker of the present invention, in use. In a first dwelling 1, the power supply line 7X from the transformer 11 located on an electric pole 9 is connected, to an electric home apparatus 3, bulb 4, plug socket 5 and home automation appliance 6.

Also, in a second dwelling 2, a second power supply line 7Y is connected, to the electric home apparatus 3, bulb 4, plug socket 5 and home automation appliance 6. Here, the power line carrier frequency breaker 1 3 is operatively placed between the second power supply line 7Y and the home automation appliances 6.

The function of the above construction will be described as follows:

A normal supply voltage is supplied, through the power supply lines 7X, 7Y, to the electric home apparatus 3, bulb 4 and plug socket 5 and home automation appliance 6 of each dwelling 1 and 2, respectively. A control power line carrier frequency of, for example 120+10 KHZ, is generated by the home automation appliance 6 in each dwelling. Thus, the operator uses the electric appliances connected to the plug socket 5, electric home apparatus 3, and bulb 4 which are present in the first dwelling 1. The second dwelling 2 utilizes the remote controller of the home automation appliance 6. At this time, in case of the first dwelling 1, the power line carrier frequency generated in the home automation appliance 6 is supplied or transmitted to the electric home apparatus 3, bulb 4 and plug socket 5, and also supplied or transmitted to the other dwelling 2 via the power supply line 7X, transformer 11 and power supply line 7Y.

Accordingly, in the first dwelling 1, when the operator remote controls the electric home apparatus 3 by utilizing the home automation appliance 6, problems occur in that the electric home apparatus 3 in the second dwelling 2 is unintentionally controlled or the electric home apparatus 3 of the first dwelling 1 is unintentionally controlled by the remote control activated in the second dwelling 2, in the absence of the present invention 13.

In the second dwelling 2, the power line carrier frequency breaker 13 according to the present invention when operatively positioned enables the normal voltage source frequency to pass but blocks the power line carrier frequency to thereby isolate the second dwelling from the power line carrier frequency of the first dwelling 1.

Figure 2:
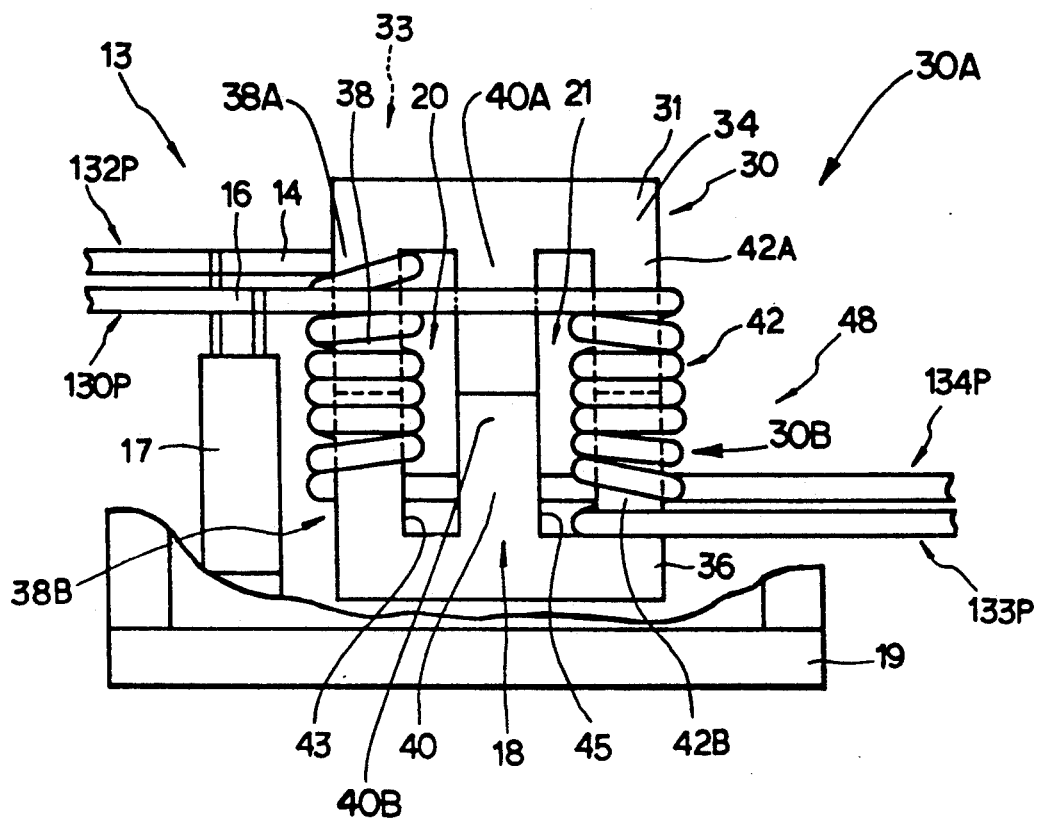
FIG. 2 illustrates the construction of the power line carrier frequency breaker according to the present invention.

FIG. 2 illustrates a power line carrier frequency breaker 13 according to the present invention.

The power line carrier frequency breaker includes a core member 30 having a first side 31 and a second side 33, a top section 34 and a bottom section 36, with a first leg 38, a second leg 40 and a third leg 42 extending between the top section 34 and the bottom section 36. Each leg is spaced apart from each other (voids 43,45) and each leg has a first portion and a second portion 38A,38B; 40A,40B; 42A,42B, respectively, to enable the top section 34, which includes the leg portions 38A, 40A, and 42A to be separable from the bottom section 36, which includes the leg portions 38B, 40B, and 42B. The first power supply line 132P is wound around the first leg 38 of the core member 30 in a first direction and exits from the same side 33 as entering the core member to form a first coil winding 14. Thus, the first direction may be counter-clockwise and the second direction clockwise, or the other way around. The second power supply line 130P is wound around the third leg 42 of the core member in a second direction which is opposite the first direction and exits from the same side 34 as entering the core member to form a second coil winding 16. The first 132P and second 130P power lines are coiled in opposite directions about first leg 38 and third leg 42, respectively, which upon exiting the core 30 the power lines are now referred to as power lines 134P, 133P, respectively. Power lines 134P, 133P are connected to the power line carrier frequency generator of the home automation appliance 6. The power line carrier frequency entering the first coil 14 and the second coil 16 from the power supply lines is blocked and the power line carrier frequency inputted from the home automation appliance is blocked by the breaker 13.

It is important to note that the first power supply line enters the core member along side 33 of the core member and is wound around the first leg of the core member in a first direction and exits from the same side as entering the core member to form a first coil winding 14. In like manner, the second power supply line 130P enters the core member along the remaining side, i.e. side 34, of the core member and is wound around the third leg of the core member in a second direction which is opposite the first direction and exits from the same side as entering the core member to form a second coil winding 16, as illustrated at FIG. 2. It is critical that each winding 14, 16 enter and leave the same side of the core member, respectively. It is also critical that each coil winding 14, 16 enter and leave on opposite sides, respectively as illustrated at FIG. 2. That is, each coil 14,16 starts coiling around its respective leg on one side of the core member and stops coiling around that leg on the same side of the core member, respectively; and it is also critical that each coil 14,16 start and stop winding about its respective leg on opposite sides of the core member, respectively, as illustrated at FIG. 2.

When the normal frequency and the powerline carrier frequency from the power supply line 7Y connected to the lead-in lines 132P, 130P of the first coil 14 and of the second coil 16, respectively, are inputted to the lead-in lines 132P, 130P there is no loss in the normal frequency so that the normal frequency is supplied, through the power lines coming from the breaker 13 to the home automation appliance 16 and the bulb 4 described in FIG. 1.

On the other hand, the loss in the power line carrier frequency becomes more than −50 dB so that the power line carrier frequency is not able pass the first coil 14 and the second coil 16 and enter into the electrical circuit of dwelling 2. That is, the power line carrier frequency is blocked. Here, the condenser 17 connected to the terminal between the first coil 14 and the second coil 16 functions to absorb irregular noise in the line.

Figure 3:
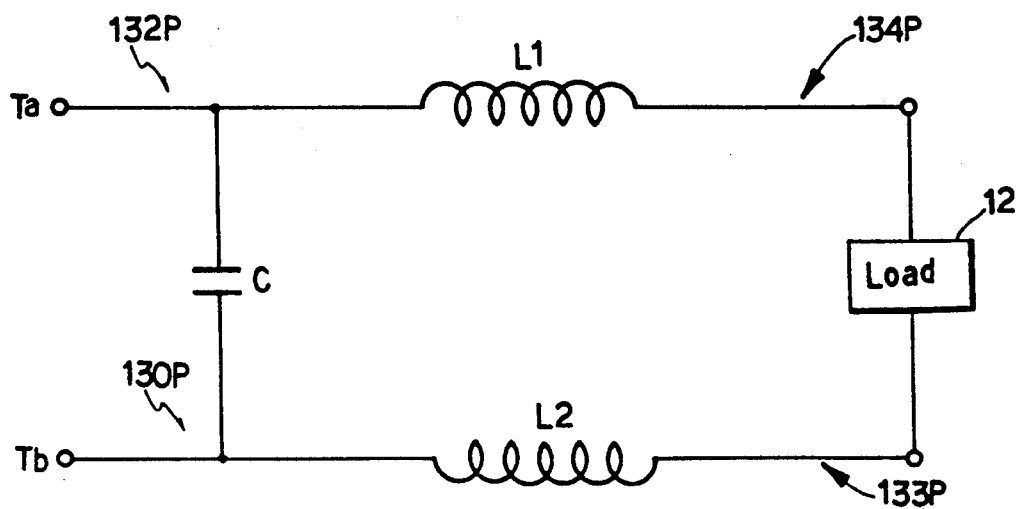
FIG. 3 is a schematic diagram of the circuit of FIG. 2.

FIG. 3 is a schematic illustration of the circuit of FIG. 2. The power line inputs 130P, 132P runs from terminals Ta and Tb of the power supply line 7Y to each coil (L1, L2), respectively, in serial. The output lines form each coil (L1,L2) 134P,133P connect, in parallel, to the electrical load 12, namely the electric appliances 3, bulbs 4, plug socket 5 and home automation appliance 6. Condenser C is connected, in parallel, to each terminals Ta, Tb of the power supply line 7Y.

Accordingly, for example, assuming that a sine wave having a frequency of 60 HZ is applied to each of terminals Ta, Tb of the power supply line 7Y, the inductance of coils L1 and coil L2 is 111 uH, respectively.

Figure 4A:
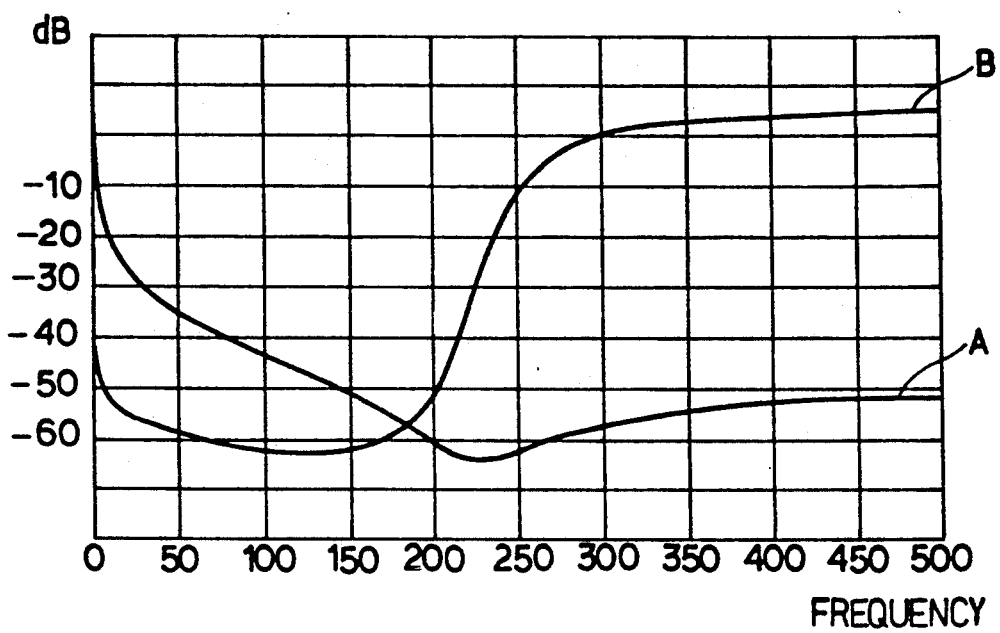
FIG. 4A illustrates the frequency characteristics measured at the input of the power line carrier frequency breaker of the present invention and the prior art thereof.

FIG. 4A illustrates the frequency characteristics measured at the input of the power line carrier frequency breaker of the present invention and the prior art thereof. Here, curve A is the frequency characteristic of the power line carrier breaker according to the present invention and curve B is the frequency characteristic of the prior art. As illustrated, the frequency characteristic of the power line carrier frequency breaker has a loss of −3 dB to −52 dB at 50 KHZ to 500 KHZ bandwidth and becomes =62.211 dB at 225 KHZ bandwidth. On the other hand, the frequency characteristic of the prior art power line carrier frequency breaker has a loss of −60 dB at 50 KHZ to 200 KHZ band width and becomes approximately 0 dB at 250 KHZ to 500 KHZ bandwidth. Accordingly, a power frequency blocking effect is not expected.

Also, the center axis of frequency can be varied by controlling the thicknesses of coil L1 and coil L2 so that the desirable frequency setting between full bandwidth of 0 to 500 KHZ is possible by controlling the thickness or gauge of the wire forming coil L1 and coil L2, and a minute control can be controlled by a capacitance variation.

Figure 4B:
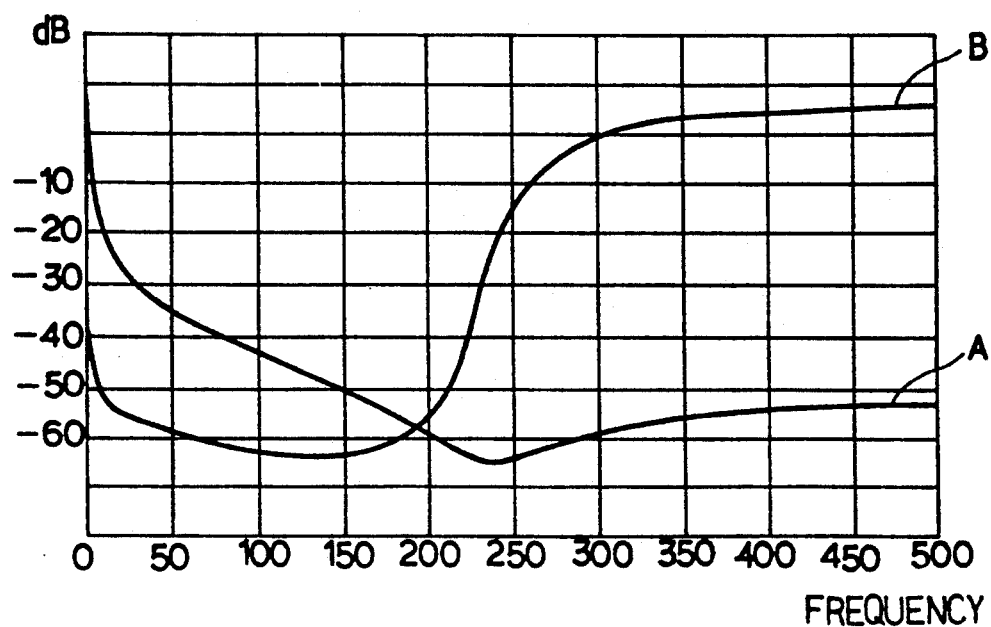
FIG. 4B illustrates the frequency characteristics measured at the output of the power line carrier frequency breaker of the present invention and the prior art thereof.

FIG. 4B illustrates the frequency characteristics measured at output of the power line carrier frequency breaker of the present invention and the prior art.

Here, curve A is the frequency characteristic of the prior art power line frequency breaker and curve B is the frequency characteristic according to the present invention. A detailed description of this characteristic will be abbreviated for having a similarly characteristic as described in FIG. 4A.

Thus, according to the present invention, input-output impedance matching can be obtained simply and the manufacturing cost is reduced because of the reduction of the number of parts and especially, since the power line carrier frequency breaker of the present invention is subminiature, which can be established directly on the switch board of the home or dwelling and also can be used in combination with a leakage breaker or a power line blocking switch in a single electrical box.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention.

What is claimed is:

1. A power line carrier frequency breaker for use with a first and a second power supply line, said breaker comprising:

a core member having a first side and a second side, a top section and a bottom section, with a first leg, a second leg and a third leg extending between said top section and said bottom section with each leg being spaced apart from each other and each leg having a first portion and a second portion, respectively, to enable said top section, which includes said first leg portions and together define a top core section, to be separable from said bottom section, which includes said second leg portions and together define a bottom core section, to permit, in use, the first power supply line to enter said core member from one of said sides of said core member and be wound around said first leg of said core member in a first direction and exit from said same side as entering said core member to form a first coil winding and the second power supply line to enter said core member from the remaining of said sides of said core member and is wound around said third leg of said core member in a second direction which is opposite said first direction and exits from said same side as entering said core member to form a second coil winding and with said lines then being connected to a power line carrier frequency generator of a home automation appliance whereby the power line carrier frequency entering said first coil and said second coil from said power supply lines is blocked and the power line carrier frequency inputted by said home automation appliance is blocked.

2. A power line carrier frequency breaker in accordance with claim 1, further including a condenser connected in parallel to said power supply lines prior to said power supply line being wound around said first leg and said third leg of said core member, respectively, for absorbing irregular power line noise.

3. A power line carrier frequency breaker in accordance with claim 1, wherein said first and second portions of said legs have equal length such that said top core section of said core member and said bottom core section of said core member are similar.

4. A power line carrier frequency breaker for use with a first and a second power supply line, said breaker comprising:

a core member having a first side and a second side and a top section and a bottom section with a first leg, a second leg and a third leg with each leg being of an equal length and extending between said top section and said bottom section with each leg being spaced apart from each other and each leg has a first portion and a second portion, respectively, to enable the top section, which includes said first leg portions and together define a top core section, to be separable from the bottom section, which includes said second leg portions and together define a bottom core section;

a condenser connected in parallel to said power supply line lines prior to said power supply line being wound around said first leg and said third leg of said core member, respectively, for absorbing irregular power line noise whereby, in use, the first power supply line to enter said core member from one of said sides of said core member and be wound around said first leg of said core member in a first direction and exit from said same side of said core member as entering said core member to form a first coil winding and the second power supply line to enter said core member from the remaining of said sides of said core member and is wound around said third leg of said core member in a second direction which is opposite said first direction and exits from said same side of said core member as entering said core member to form a second coil winding and with said lines then being connected to a power line carrier frequency generator of a home automation appliance whereby the power line carrier frequency entering said first coil and said second coil from said power supply lines is blocked and the power line carrier frequency inputted by said home automation appliance is blocked.

5. A power line carrier frequency breaker, comprising:

a first and a second power supply line for supplying electrical power;

a core member having a first side and a second side and a top section and a bottom section with a first leg, a second leg and a third leg extending between said top section and said bottom section with each leg being spaced apart from each other and each leg has a first portion and a second portion, respectively, to enable the top section, which includes said first leg portions and together defines a top core section to be separable from the bottom section, which includes said second leg portions and together define a bottom core section;

said first power supply line entering said core member from one of said sides of said core member and is wound around said first leg of said core member in a first direction and exiting from said same side as entering said core member to form a first coil winding; and said second power supply line entering said core member from the remaining of said sides of said core member and is wound around said third leg of said core member in a second direction which is opposite said first direction and exiting from said same side as entering said core member to form a second coil winding and with said lines then being connected to a power line carrier frequency generator of a home automation appliance whereby the power line carrier frequency entering said first coil and said second coil wound around said core member from said power supply lines is blocked and the power line carrier frequency inputted by said home automation appliance is blocked.

6. A power line carrier frequency breaker in accordance with claim 5, wherein said first and said second power supply lines each enter from said core member at said top section and each exit said core member from said bottom section.

7. A power line carrier frequency breaker in accordance with claim 5, wherein each said first portion and said second portion of each said leg have equal length such that said top core section of said core member and said bottom core section of said core member are the same.

8. A power line carrier frequency breaker, comprising:
   a first and a second power supply line for supplying electrical power;
   a core member having a first side and a second side and a top section and a bottom section with a first leg, a second leg and a third leg with each leg having the same length and extending between said top section and said bottom section and each leg being spaced apart from each other and each leg has a first portion and a second portion, respectively, to enable the top section, which includes said first leg portions and together define a top core section to be separable from the bottom section, which includes said second leg portions and together define a bottom core section and each said first portion and said second portion of each said leg having the same length such that said top section of said core member and said bottom section of said core member are similar;
   said first power supply line entering said core member from one side of said sides of said core member and is wound around said first leg of said core member in a first direction and exiting from said same side as entering said core member to form a first coil winding; and
   said second power supply line entering said core member from the remaining of said sides of said core member and is wound around said third leg of said core member in a second direction which is opposite said first direction and exiting from said same side as entering said core member to form a second coil winding and said first and said second power supply lines each enter from said core member at said top section and each exit said core member from said bottom section and with said lines then being connected to a power line carrier frequency generator of a home automation appliance whereby the power line carrier frequency entering said first coil and said second coil wound around said core member from said power supply is blocked and the power line carrier frequency inputted by said home automation appliance is blocked.

* * * * *

UNITED STATES PATENT AND TRADEMARK OFFICE
CERTIFICATE OF CORRECTION

PATENT NO.   :   5,304,850

DATED        :   April 19, 1994

INVENTOR(S) :   Young Tae Yoon

It is certified that error appears in the above-identified patent and that said Letters Patent is hereby corrected as shown below:

On the cover page, under "Assignee" [73], "Kyong Sun Jun" should read --Kyong Ho Jun--.

Signed and Sealed this

Twenty-eighth Day of December, 1999

*Attest:*

Q. TODD DICKINSON

*Attesting Officer*     *Acting Commissioner of Patents and Trademarks*